Feb. 12, 1924.

M. G. O'BRIEN

REPAIR PLUG

Filed May 7, 1919

1,483,311

INVENTOR.
Michael G. O'Brien,
BY
Arthur G. Jenkins
ATTORNEY.

Patented Feb. 12, 1924.

1,483,311

UNITED STATES PATENT OFFICE.

MICHAEL G. O'BRIEN, OF BRISTOL, CONNECTICUT.

REPAIR PLUG.

Application filed May 7, 1919. Serial No. 295,440.

*To all whom it may concern:*

Be it known that I, MICHAEL G. O'BRIEN, a citizen of the United States, and a resident of Bristol, in the county of Hartford and State of Connecticut, have invented a new and Improved Repair Plug, of which the following is a specification.

My invention relates more especially to that class of repair plugs used for mending boilers and other devices where access cannot be had to the interior, and an object of my invention, among others, is to provide a repair plug that may be effectively employed to stop a leak in a boiler or like device and one that may be readily inserted in place.

One form of plug embodying my invention and in the construction and use of which the objects herein set out, as well as others, may be attained, is illustrated in the accompanying drawings, in which—

Figure 1:
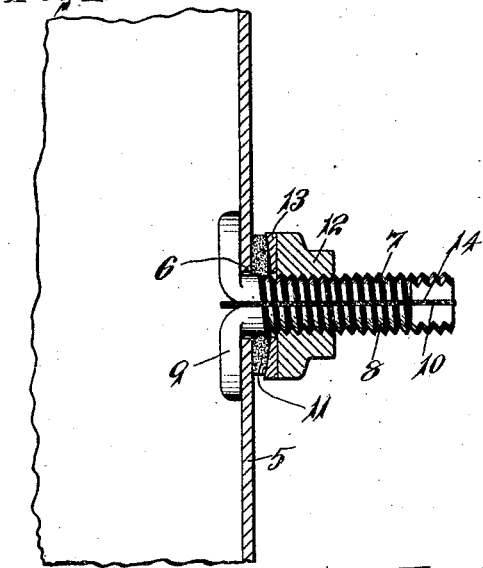
Figure 1 is a view in section through a portion of a boiler showing my improved plug attached thereto.
Figure 2:
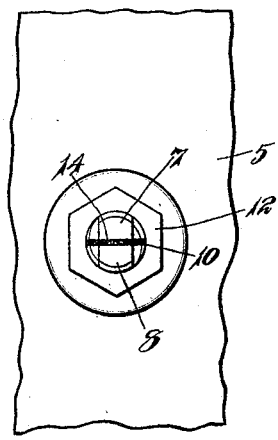
Figure 2 is a face view of the same looking from the outside.
Figure 3:
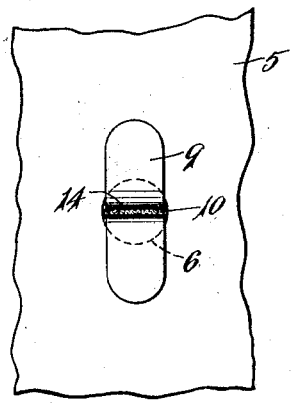
Figure 3 is a view looking from the inside.

In the accompanying drawings the numeral 5 indicates a portion of a boiler or like device adapted to contain fluid, especially liquid, as hot-water, and 6 denotes a hole in the wall thereof, such hole usually being an enlargement of the hole comprising the original leak, the hole being enlarged to the proper size to receive the repair plug.

My improved plug comprises two members 7—8 of like construction, the main part being threaded, and the two members when placed together comprising a threaded stud. Each member has a foot 9 bent at an angle—substantially a right angle—to the main part so that when the two members are united the feet extend outwardly in opposite directions and engage the inner surface of the boiler, as clearly shown in Figure 1. A packing 10 is located between the two members, preferably extending for the whole length thereof and a packing washer 11 surrounds the members at the base of the threaded portions and against the outer surface of the boiler, a nut 12 fitting the threaded stud comprising the two members assembled, said nut forcing the packing washer tightly against the outer surface of the boiler to pack the joint thereat. If preferred a metal washer 13 may be located between the packing washer and the nut to prevent transmission of torsional force from the nut to the washer. The outer end of the stud comprising the two members may be flattened or otherwise angularly formed as at 14 for the purpose of receiving a wrench, pliers or other suitable tool to prevent turning movement of the stud when the nut is being screwed to place.

In operation a leak having occurred in a boiler, the hole comprising this leak is cut out by a suitable tool to form a larger hole 6 and the feet on the members 7 and 8 are separately inserted through this hole and the two members are then placed together as shown in Figure 1 to form the stud. The packing washer is placed in position and the nut is screwed to place. In this screwing of the nut to place should there be any tendency of the stud to turn, a wrench or other suitable tool may be applied to the flattened portion 10 to prevent such turning movement until the nut has been tightened sufficiently. The outer ends of the two members 7 and 8 may then be cut off flush with the nut if desired to constitute a finished job.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

A repair plug comprising a screw threaded stud divided into two members, feet extending each at an angle to the main part of each of said members and in opposite directions from the stud as a whole, a packing located between said members and extending from side to side thereof and lengthwise therealong to the inner end of said member to prevent flow of fluid between the meeting faces of said members, a packing surrounding said members in contact with the edges of the packing between said members, and a nut to bind said last mentioned packing in place.

MICHAEL G. O'BRIEN.